Patented Nov. 21, 1950

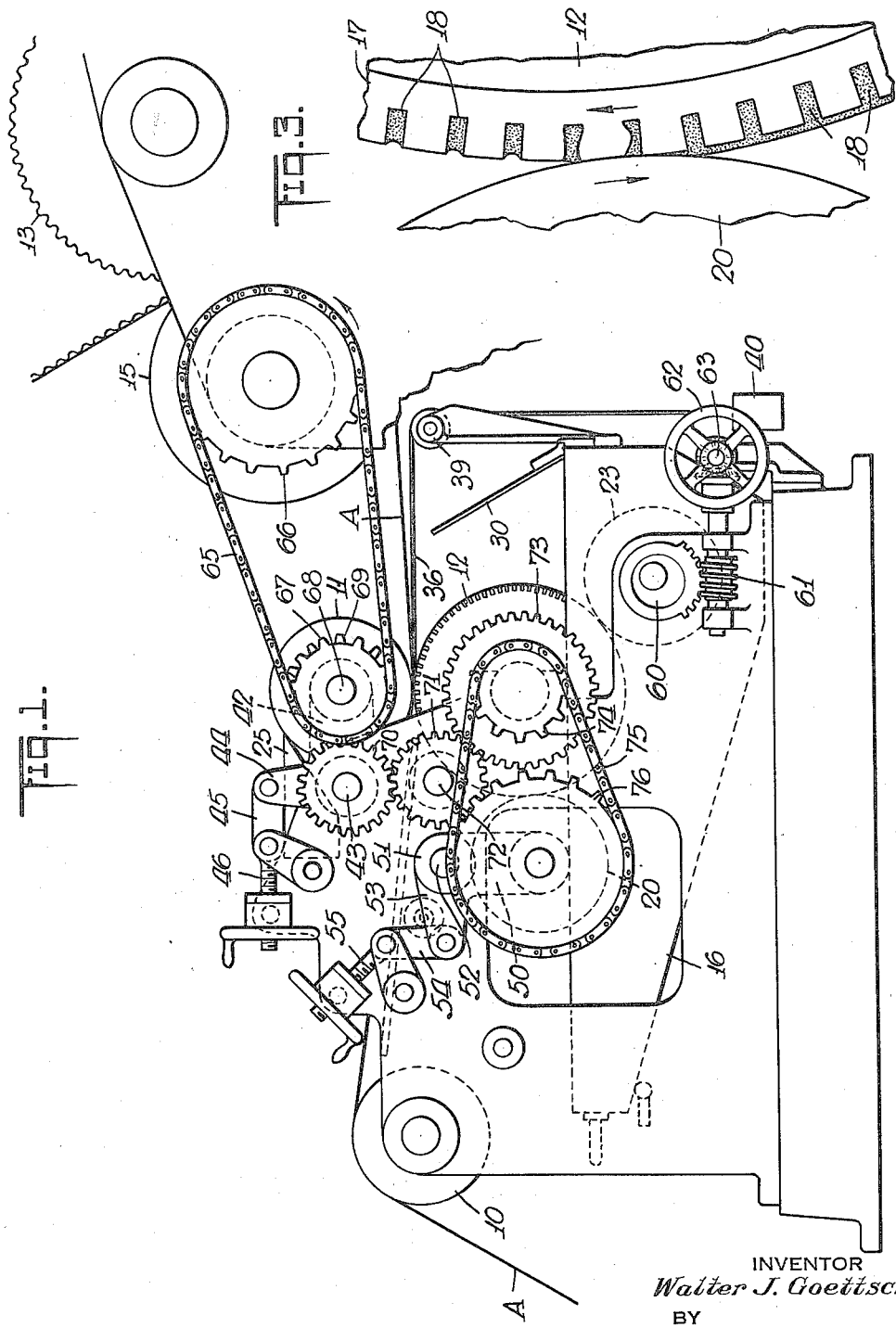

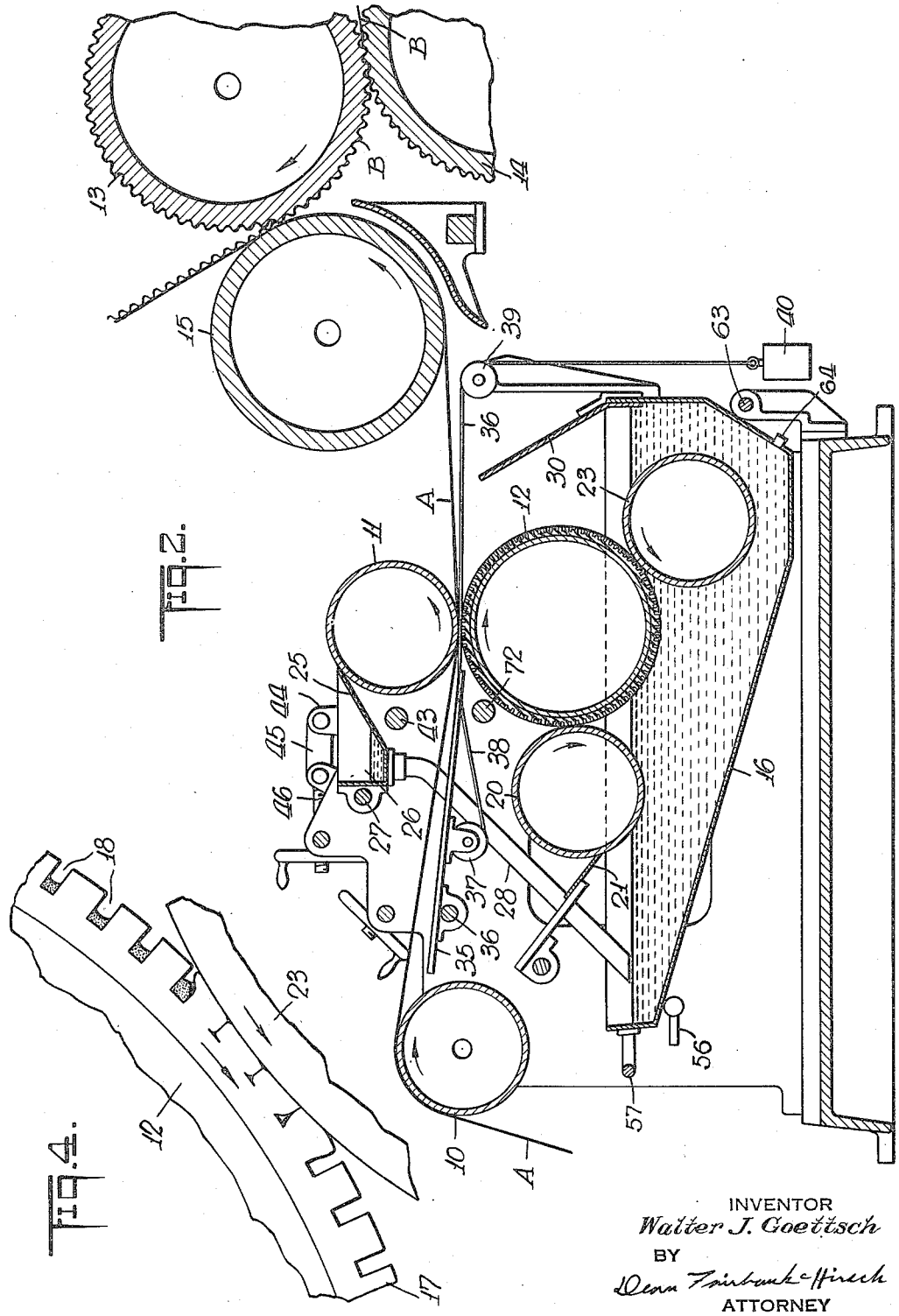

2,531,036

UNITED STATES PATENT OFFICE 2,531,036

APPARATUS FOR APPLYING PATTERN FORMING MATERIAL

Walter J. Goettsch, Kenilworth, Ill., assignor to Samuel M. Langston Co., a corporation of New Jersey Application July 26, 1946, Serial No. 686,339

2 Claims. (Cl. 91—12)

Broadly considered, this invention relates to the forming of repetitive patterns on advancing sheet material, and in its preferred embodiment relates to the manufacture of corrugated paper board formed of a corrugated sheet with the crowns of the corrugations glued to a facing sheet, and by a process and apparatus in which the adhesive is applied to the facing in stripes constituting the repetitive pattern.

In the manufacture of corrugated board of this character the adhesive is commonly applied to the crowns of the corrugations of one sheet while it is held on one of the two corrugating rollers, and the facing sheet is then brought into contact therewith. Machines of this type are shown for instance in the Langston Patents 1,186,997 and 1,642,782, and the Sieg Patent 1,947,066. In this type of machine it is necessary to employ a plurality of guiding fingers or crescents to hold the corrugated sheet in the corrugations of one of the rollers while it is advanced to and brought in contact with the facing sheet, and the adhesive is applied to the corrugations while the sheet is held in place by said guiding fingers. As a result, dry streaks may be left along the sheet corresponding to the positions of the guiding fingers, so that the gluing does not extend continuously across the width of the product. Furthermore, these guiding fingers are usually so formed as to permit the corrugated sheet to "fluff-out" into contact with the adhesive applying roller, as shown in said Sieg Patent 1,947,066. The extent to which the sheet fluffs out varies with the speed of operation of the machine and with the stiffness and thickness of the corrugated sheet.

The adhesive may be applied as a stripe pattern to the facing sheet, as shown for instance in my Patent 2,051,296, and in the Sieg Patent 2,051,319. In machines of this type the transverse stripes on the facing sheet are in such position and spacing as will insure registration with the crowns of the corrugations of the corrugated sheet when the two are brought together.

Where the adhesive is picked up by one corrugated roll and transferred therefrom to a second corrugated roll meshing therewith, and then transferred from the second roll to the sheet, as shown in my Patent 2,051,296, it is difficult to insure the application of the same amount of adhesive to each stripe, as varying amounts may remain on the ridges, depending in part on the speed of rotation and the action of centrifugal force. In the Sieg Patent 2,051,319 there is provided a pick-up roll, a transfer roll, and a separate fluid cleaning corrugated roll for cooperation with the corrugated roll which applies the adhesive to the facing sheet.

The main object of the present invention is to provide means for varying and accurately controlling the amount of adhesive applied as a pattern to an advancing sheet to insure the application of the desired amount of adhesive at the desired points, and independent of variations in the speed of operation of the machine.

A further object is to provide simple means for regulating at will the amount of pattern forming material applied to the sheet, and to apply it in the desired pattern without liability of leaving undesirable dry streaks or gaps.

As an important feature of my invention there is provided a transfer roller which has an outer surface portion of resilient material, and provided with pockets or recesses of a design, shape and spacing corresponding with the stripes or other desired pattern to be formed on the sheet material. The roller is so mounted that it is partially immersed in the supply of adhesive or other pattern forming material, and upon rotation carries material in the pockets to the point where the roller engages the sheet material on which the pattern is to be formed.

As a further important feature, means are provided whereby the amount transferred to the sheet may be varied at will as the sheet is pressed into contact with the surface of the roller. By varying the degree of pressure the resilient material is distorted and the pockets are partially collapsed to a varying degree, and thus more or less of the material is forced out of the pockets onto the sheet.

As a further feature, means are provided for partially collapsing the pockets to force out a small portion of the material and thus insure that none of it flows out onto the surface of the roller while being brought to the point where the roller contacts the sheet, and at the same time cleaning the surface of the transfer roller intermediate of the pockets.

A further object of the invention is to insure the uniformity of the material applied to the sheet. This is effected by substantially completely collapsing the pockets after they leave the sheet, so as to remove all residual material therefrom and insure the refilling of the pockets with fresh material from the source of supply.

These objects may be accomplished by the use of three rollers at spaced points around the periphery of the transfer or adhesive applying roller, and adjustable to press against the latter to the desired extent.

The roller which substantially completely collapses the pockets may be mounted in the container and contact with the transfer roller below the liquid level of the adhesive. The roller which cleans the surface of the transfer roller may contact with the latter above the liquid level and may rotate in the same direction, so that it acts to partially collapse and remove excess material from the pockets, and also acts as a wiper. The third roller, which is mounted above the transfer roller, and which presses the sheet against the transfer roller, controls the amount of adhesive applied, as by varying the pressure the pockets may be collapsed to the required extent to force out the desired amount of adhesive.

As a further feature, the sheet is guided between the adhesive transfer roller and the upper pressure roller by a series of fine parallel wires which are sufficiently small to prevent the leaving of any dry streaks on the sheet. The pressure causes them to be partially embedded in the resilient material of the transfer roller without leaving any permanent grooves in said resilient material.

In the accompanying drawings there is illustrated one embodiment of my invention. In these drawings:

Fig. 1 is a side elevation of the apparatus.

Fig. 2 is a vertical longitudinal section through the apparatus.

Fig. 3 is a section corresponding to a portion of Fig. 2, but on a very much larger scale, and Fig. 4 is a section corresponding to another portion of Fig. 2, and also on a larger scale.

In the specific apparatus illustrated, a sheet A on which the pattern is to be formed, is delivered over a roller 10, thence between a pair of rollers 11 and 12 where the pattern is formed on the sheet. If the sheet is to be the facing sheet of corrugated paper, a second sheet B may be corrugated in any suitable manner, as for instance by passing between the usual type of corrugating rollers 13 and 14, and the facing sheet A is pressed against the corrugated sheet B while the latter is still on the corrugated roller 13, by means of a roller 15.

In my improved apparatus the roller 12 is mounted so that its lower portion dips into the adhesive or other pattern forming material in a container 16, and the roller 11 is mounted directly above the roller 12. This roller 12 constitutes the transfer roller for applying the adhesive or other pattern forming material in the desired pattern on the lower surface of the sheet A.

As an important feature of the present invention the roller 12 has a peripheral portion 17 which is formed of rubber, synthetic rubber, or other suitable resilient material, and in the peripheral surface of this resilient layer there are formed a series of pockets 18 which receive the liquid or other flowable pattern forming material from the container 16 and transfer it to the sheet A. In the manufacture of corrugated paper these pockets are in the form of grooves or channels extending lengthwise of the roller and spaced apart to a distance equal to the distance between the crowns of the corrugations of the sheet B. As the foller 12 rotates it picks up adhesive from the container 16 and carries it up to and applies it onto the under surface of the sheet A.

The adhesive may be a relatively thick viscous material, and will adhere to the surface of the roller between the pockets as well as filling the latter, and may tend to flow out of the pockets onto the surface.

As one feature of my invention I provide a roller 20 which presses against the resilient surface portion 17 of the roller 12 as shown in Figs. 2 and 3. By rotating both the roller 20 and the roller 12 clockwise, the surface of the former will move down in rubbing or wiping contact with the surface of the latter to wipe said surface clean, and preferably it has a lower peripheral speed than that of the roller 12, particularly where the mechanism is to be operated at high speed. At the same time, the roller 20 is pressed against the resilient surface to partially collapse the pockets in succession, as shown in Fig. 3, so as to force some of the material out of the pockets, leave the meniscus of the remaining material slightly below the peripheral surface of the roller, and reduce the liability of any material flowing out of the pockets onto the surface on the way from roller 20 to the point of transfer of the material to the sheet A. The pressure of the roller 20 against the roller 12 may be varied at will, as hereinafter described. To keep the surface of the roller 20 clean there is provided a suitable scraper 21 acting on said surface on the up-moving side.

The roller 11 presses the advancing sheet A onto the surface of roller 12 with sufficient pressure to partially collapse the pockets and to bring the meniscus of the material up to or slightly above the peripheral surface, and thus into contact with the sheet. By varying the pressure applied to the roller 11, the amount transferred to the sheet may be varied at will, and the proper amount applied so as to give good adhesion between the sheets A and B where they come together between the rollers 13 and 15. The rollers 10, 13, 14 and 15 will normally be heated by the use of steam, which heat aids in the settling of the adhesive and the evaporation of volatiles therefrom. If desired, additional heating means may be employed.

As all of the material is not forced out of the pockets by the pressure of the roller 11 and the absorption onto the sheet, the residual amount might carried around on the roller 12 and might dry or harden in the pockets when the machine is stopped. To prevent this action a roller 23 is provided and pressed against the roller 12, preferably on the down-moving side or the lower side, and preferably below the liquid level in the container 16. The pressure applied by this roller 23 is greater than that applied by the rollers 20 or 11, and is such as to substantially completely collapse the pockets as shown in Fig. 4. Thus all of the residual material is ejected from the pockets, and as they open up again they take in a fresh supply from the container. Preferably the roller 23 is completely immersed in the adhesive.

As the sheet A may be of any desired width, and in some cases may be substantially narrower than the length of the roller 12, some of the adhesive ejected from the pockets may come into direct contact with the roller 11. The same will happen if the sheet A should break or have a hole in it, or when the end of the sheet is reached. To remove any such adhesive from the roller 11 there is provided a scraper 25 which may form one wall of a trough 26 pivoted at 27 so as to press it against the surface of the roller 11, and having a drain pipe 28 leading back to the container 16.

A splash board 30 may be provided to catch and return to the container any liquid thrown out by the rollers 12 and 23 if the machine be operated at high speed.

To guide the end of the sheet A in threading up, and to prevent the end from dropping into the container if the sheet breaks, guiding means is employed. This is shown as a guide board 35 pivoted at 36 near the roller 10 and extending substantially to the roller 12 near the upper side of the latter. Secured to the under side of this board is a bar or spindle 37 on which are wound a plurality of fine wires 38. These wires extend below or through the free end of the guide board 35 and then between the rollers 11 and 12 over a roller 39 to weights 40. Thus the wires are kept taut and will support the sheet A beyond the roller 12 in threading up, or if the sheets break. When the roller 11 is raised this also causes the free end of the guide board 35 to raise. The raising of the free end of the guide board 35 and the wires attached thereto lifts the sheet of material A out of engagement with the roller 12 whenever the roller 11 is raised.

The wires are preferably very fine so that they may be pressed into the resilient surface of the roller 12 by the action of sheet A and roller 11, and do not prevent the proper application of the adhesive to the sheet A or leave any dry streaks on the sheet. If the wires wear from friction with the sheet, or if they break, another portion may be unwound from the bar or spindle 37 and the weights 40 reattached.

Various means may be employed for mounting the rollers 11, 20 and 23 so as to facilitate varying the pressure on the roller 12. As shown in Fig. 1, the roller 11 is mounted on bell crank levers 42 pivoted at 43. The upper arms 44 are connected by a link 45 to an adjusting screw 46, so that the roller 11 may be lifted or pressed down with the desired pressure. The roller 20 is also mounted on the depending arms 50 of bell crank levers 51 pivoted at 52, and the outer arms 53 are connected by links 54 to an adjusting screw 55. The roller 23 is shown as mounted on an eccentric bearing 60 which may be rotated by a worm 61 to move the roller 23 toward and from the roller 12.

The worm may be rotated by any suitable means, as for instance a hand wheel 62 on a shaft 63 connected to the shaft of the worm wheel by bevel gears.

The container may have a drain outlet 64 if desired, and may be pivotally supported on the axis of the roller 23 and supported by a pin 56. By removing this pin the container may be lifted or lowered by a handle 57.

The roller 10 may be an idler and the roller 23 may be rotated by reason of the pressure applied by the roller 12, but the rollers 11, 12 and 20 are driven in timed relationship to the roller 15, and from the shaft of that roller. As shown, the rollers 11 and 15 are connected by a chain 65 and sprockets 66 and 67, the latter being on the shaft 68 of the roller 11. On the same shaft is a gear 69 which meshes with an idler 70 on the pivot 43 of the bell crank 42, and this idler meshes with a second idler 71 on a spindle 72, which idler 71 meshes with a gear 73 connected to the roller 12. Connected to this gear 73 is a sprocket wheel 74 connected by a chain 75 to a sprocket wheel 76 on the shaft of the roller 20. The relative pitch diameters of the sprocket wheels 74 and 76 are such in respect to the relative diameters of the rollers 20 and 12 that the roller 20 has a somewhat lower peripheral speed than the roller 12, so as to give the wiping action hereinbefore referred to.

It is of course important that the stripes be applied to the sheet A in such positions that they will register with the corrugations on the sheet B. Therefore, the roller 11 and gear 69 are rotatably adjustable in respect to the sprocket wheel 67. Furthermore, this adjusting means should be of a type which can be operated while the machine is running. The details of such a running register form no portion of my invention, and may be of the type shown in my Patent 2,051,296, hereinbefore referred to.

Although the invention is illustrated only in connection with a machine for making corrugated board, the sheet A need not be delivered to a corrugated sheet, the pockets on the roller may be so shaped as to apply the pattern forming material in any desired design, and the pattern forming material need not be an adhesive, but may be a printing paste or any other material for forming a pattern on advancing sheet material. This sheet material need not be a continuous sheet, but may be separate sheets fed in succession, as in a printing press.

In the making of corrugated paper, the grooves may be $\frac{1}{16}$ of an inch wide and $\frac{1}{8}$ of an inch deep, so that a narrow stripe of adhesive is applied, but the grooves contain at least three times the volume of adhesive applied as a single stripe. The surface tension of the side walls and bottoms of the grooves will hold the adhesive in place even at high speed, thus preventing spray or bead formation.

Different kinds of adhesive require the application of different amounts, and by varying the pressure on the roller the proper amount of any particular adhesive may be applied.

For applying patterns in the making of products other than corrugated paper, the pockets may be of any desired shape, for instance they may be circular and close together, to apply the material as a stippled pattern, for instance in machines for combining or laminating sheets, or making linings.

The cleansing roller 23 may be omitted if the material is of a character that does not harden or change in composition or character when exposed to the air.

In the foregoing description I have referred to the material in the container 16 as adhesive, but it will be obvious that it may be only one constituent or reactant which will unite with another constituent or reactant to form the desired adhesive. In many cases a quick-setting water resistant adhesive is very desirable, but very few such adhesives are available, and those are too expensive. A quick-setting adhesive is particularly important in the operation of high speed machines, but a quick-setting adhesive dependent on chemical reaction cannot be used in the ordinary corrugating equipment, as the reaction would take place before the adhesive reached the sheet. The mechanism I have illustrated might be employed for applying the main constituent of the adhesive, and the other constituent or setting agent might be applied by a second unit of the same type operated in timed relationship therewith, or in any other suitable manner, as for instance by applying it to the crowns of the corrugations of the sheet while the latter is on the roller 13. Thus the two constituents or reactants would come together only where the sheets come together. As an example, casein might be applied by the apparatus illustrated, and formaldehyde thereafter applied to very rapidly effect the setting and the formation of a waterproof adhesive.

In some cases it is desirable to employ two different adhesives, one quick-setting and the other slow-setting, as disclosed in the Hill Patent 2,384,676 (Re. 22,842). The apparatus herein illustrated may be employed for applying one of the adhesives to the liner sheet only at those points which would come directly into contact with the parts of the corrugations or flutes which have already received the other adhesive or a chemical which will react with the applied adhesive.

The apparatus may be employed for various other purposes.

Having thus described my invention what I claim a new and desire to secure by Letters Patent is:

1. An apparatus for applying pattern forming material to an advancing sheet, including a container for the pattern forming material, a roller for applying said material, said roller having a horizontal axis and having its peripheral portion formed of a layer of resilient material with alternate longitudinally extending ridges and grooves in the outer surface thereof, each of said ridges presenting a smooth, substantially flat outer surface, said roller being positioned with its axis above and its lower portion beneath the level of the material in said container, a member contacting with the surfaces of said ridges after the latter move upwardly above the level of the material, thereby to wipe material from said surfaces, and means above said roller for pressing an advancing sheet into contact with the surfaces of the ridges of the roller to transfer stripes of material from said grooves to said sheet.

2. An apparatus for applying pattern forming material to an advancing sheet, including a container for the pattern forming material, a roller for applying said material, said roller having a horizontal axis and having its peripheral portion formed of a layer of resilient material with alternate longitudinally extending ridges and grooves in the outer surface thereof, each of said ridges presenting a smooth, substantially flat outer surface, said roller being positioned with its axis above and its lower portion beneath the level of the material in said container, a second roller in said container and having its axis parallel to that of said first mentioned roller and beneath the level of the material, said rollers having their axes so spaced that the second mentioned roller is rotated by frictional contact with said first mentioned roller and applies pressure to the outer surfaces of said ridges to substantially collapse said grooves while below the level of the material and expel material from said grooves and thereafter permit said grooves to open and refill with material, a third roller having a smooth peripheral surface contacting with and movable in the opposite direction from that of the adjacent surfaces of said ridges after the latter move upwardly above the level of the material, thereby to wipe material from said surfaces, and means above said first mentioned roller for pressing an advancing sheet into contact with the surfaces of the ridges of the first mentioned roller to transfer stripes of material from said grooves to said sheet.

WALTER J. GOETTSCH.

REFERENCES CITED

The following references are of record in the file of this patent:

UNITED STATES PATENTS

| Number | Name | Date |
|---|---|---|
| Re. 22,842 | Hill | Feb. 18, 1947 |
| 398,135 | Dreyfus | Feb. 19, 1889 |
| 687,481 | Kammerer et al. | Nov. 26, 1901 |
| 820,086 | Beattie | May 8, 1906 |
| 1,119,820 | Gillespie | Dec. 8, 1914 |
| 1,347,066 | Vuono | July 20, 1920 |
| 1,943,322 | Johnson | Jan. 16, 1934 |
| 2,027,523 | Erbe | Jan. 14, 1936 |
| 2,051,296 | Goettsch | Aug. 18, 1936 |
| 2,051,319 | Sieg | Aug. 18, 1936 |
| 2,116,289 | Shepherd | May 3, 1938 |
| 2,175,760 | Pierson | Oct. 10, 1939 |
| 2,339,891 | Tarnuzzer | Jan. 25, 1944 |
| 2,343,363 | Black et al. | Mar. 7, 1944 |